United States Patent
Watanabe et al.

(10) Patent No.: US 6,914,794 B2
(45) Date of Patent: Jul. 5, 2005

(54) POWER CONVERSION DEVICE

(75) Inventors: Kiyomi Watanabe, Kashiwa (JP); Teruo Tomaki, Kitakatsushika-gun (JP)

(73) Assignee: Origin Electric Company, Limited, Tokyo (JP)

( * ) Notice: Subject to any disclaimer, the term of this patent is extended or adjusted under 35 U.S.C. 154(b) by 54 days.

(21) Appl. No.: 10/454,397

(22) Filed: Jun. 3, 2003

(65) Prior Publication Data

US 2004/0105288 A1 Jun. 3, 2004

(30) Foreign Application Priority Data

Dec. 3, 2002  (JP) ..................................... P2002-351078

(51) Int. Cl.⁷ .......................................... H02M 7/5387
(52) U.S. Cl. ..................... 363/132; 363/140
(58) Field of Search .............................. 363/17, 25, 37, 363/97, 98, 71, 131, 132, 91, 40, 47

(56) References Cited

U.S. PATENT DOCUMENTS 5,771,163 A * 6/1998 Moriguchi et al. ........... 363/71

FOREIGN PATENT DOCUMENTS

| JP | 10-257780 | 9/1998 |
| JP | 2001-145371 | 5/2001 |
| JP | 2002-119067 | 4/2002 |
| JP | 2002-315350 | 10/2002 |

* cited by examiner

Primary Examiner—Rajnikant B. Patel
(74) Attorney, Agent, or Firm—Kolisch Hartwell, P.C.

(57) ABSTRACT

A low cost power conversion device operating at a high frequency with high efficiency is realized by using semiconductor switching devices such as FETs being inexpensive and having low withstand voltages and low forward voltage drops. A second error signal obtained by comparing the voltages across two input capacitors connected between both ends of a DC input power supply is subtracted/added from/to a first error signal obtained from a voltage corresponding to a combined DC output of rectifying circuits and the voltage corresponding to a predetermined reference power. Based on the resultant signals, the voltage of a control signal supplied to an inverter circuit in which the voltage across an input capacitor is higher is increased, while the voltage of a control signal supplied to another inverter circuit in which the voltage across another input capacitor is lower is decreased, thereby balancing the voltages across the input capacitors.

12 Claims, 5 Drawing Sheets

POWER CONVERSION DEVICE

BACKGROUND OF THE INVENTION

1. Field of the Invention

The present invention relates to a power conversion device such as a sputtering power supply device used in a DC (direct current) sputtering apparatus, and in particular relates to a power conversion device which is suitable for performing power conversion for a commercial AC (alternating current) high voltage power supply system which generates a voltage within the range of AC 400V to 480V.

2. Description of the Related Art

A DC sputtering apparatus introduces inert gas such as argon gas into a vacuum chamber, applies a negative polarity voltage of several hundred volts to a target electrode, and causes plasma discharge to positively ionize the inert gas. Such a DC sputtering apparatus is used as a thin film deposition apparatus which accelerates positive ions and strikes the accelerated positive ions on a target surface to evaporate a target material, and which deposits vapor of the target material on a surface of a semiconductor or on a substrate such as an optical disc to form a thin film of the target material. The rated power of a sputtering power supply device which causes plasma discharge in a vacuum or in insulating gas by using a relatively low voltage falls within a wide range of several kW to several tens kW.

Although not shown in the drawings, such a sputtering power supply device is generally provided with a rectifying circuit which converts a commercial AC voltage into a DC voltage, a single inverter circuit which converts the DC voltage output from the rectifying circuit into a high frequency AC voltage, and another rectifying circuit. The inverter circuit includes a transformer which boosts the high frequency AC voltage, and another rectifying circuit converts an AC high voltage across a secondary winding of the transformer into a predetermined high DC voltage (see, for example, to the description on page 6 to page 8 and FIG. 1 of Japanese Unexamined Patent Application, First Publication No. 2001-145371).

An AC voltage input to the aforementioned sputtering power supply device generally falls within the range of AC 200V to 220V. However, an AC voltage input to a high capacity sputtering DC power supply device falls within the range of AC 400V to 480V (hereinafter referred to as "commercial AC power supply high voltage"). When an input AC voltage falls within the range of AC 200V to 220V, the rectified voltage output from the rectifying circuit is about 300V. Therefore, it is possible to use FETs being inexpensive and having a low on-resistance value and a low withstand voltage (e.g., the withstand voltage of 500V) as semiconductor switching devices provided in the inverter circuit. However, when an input voltage is the commercial AC power supply high voltage which falls within the range of AC 400V to 480V, the maximum of the rectified voltage output from the rectifying circuit becomes a DC high voltage of approximately 620V to 744V including the fluctuation thereof. As a result, the withstand voltages of the semiconductor switching devices provided in the inverter circuit should be at least about 1000V. Accordingly, it is necessary to use FETs or IGBTs having a withstand voltage of 1000V or more as the semiconductor switching devices.

As stated above, FETs or IGBTs having a withstand voltage of 1000V or more are used in a 400V system of the commercial AC power supply high voltage whose input voltage falls within the range of 400V to 480V. However, FETs having high withstand voltages generally have high on-resistance values and bring about high power loss. In contrast, IGBTs having high withstand voltages and being capable of supplying high current are readily available, but such type of IGBT has low switching speed and it is hard to operate the IGBT at a high frequency. As a result, the size of a power conversion device becomes large and it becomes difficult to reduce the voltages of ripples.

SUMMARY OF THE INVENTION

The present invention can be applied to power conversion for the commercial AC power supply high voltage of an AC 400V system by using semiconductor switching devices, in particular FETs, having low withstand voltages. Specifically, in the present invention, two input capacitors are connected in series across an input DC power supply voltage, two inverters constituted by FETs having low withstand voltages are respectively connected between both ends of the input capacitors, and control signals supplied to the inverters are modulated so that each of the voltages applied to the inverters is approximately half of the input DC power supply voltage. As a result, the voltages across the input capacitors balance with each other, and it becomes possible to employ semiconductor switching devices such as FETs having withstand voltages lower than the input DC power supply voltage.

A first aspect of the present invention is a power conversion device which includes: n, n being an integer greater than one, input capacitors which are connected in series between output terminals of a DC input power supply; n inverter circuits which include n inverters whose input terminals are respectively connected to both ends of the input capacitors, and n transformers which have primary windings respectively connected to the n inverters and secondary windings electro-magnetically coupled with the primary windings; and n rectifying circuits which convert AC voltages across the secondary windings into DC voltages, wherein the DC voltages output from the rectifying circuits are combined with each other, semiconductor switching devices used in the inverter circuits have withstand voltages lower than the maximum value of an output voltage of the DC input power supply, and the inverter circuits are controlled such that input voltages applied to the respective inverter circuits are approximately equal to a voltage obtained by dividing the output voltage of the DC input power supply by n so as to balance the voltages across the input capacitors with each other and to voltages lower than the withstand voltages of the semiconductor switching devices are applied to the semiconductor switching devices.

A second aspect of the present invention is a power conversion device which includes: first and second input capacitors which are connected in series between output terminals of a DC input power supply; first and second inverter circuits which include first and second inverters whose input terminals are respectively connected to both ends of the first and second input capacitors, and first and second transformers which have primary windings connected to the first and second inverters and secondary windings electro-magnetically coupled with the primary windings; first and second rectifying circuits which convert AC voltages across the secondary windings into DC voltages; a first error amplifier which generates a first error signal e1 based on a predetermined reference value and a signal corresponding to the detected value of either one of an output power, a DC output voltage, or a DC output current obtained by combining outputs of the first and second rectifying circuits; a second error amplifier which generates a second error signal e2 by comparing the voltage across the first input capacitor with the voltage across the second input capacitor; a first control circuit which controls the first inverter based on a signal obtained by subtracting the second error signal e2 from the first error signal e1; and a second control circuit which controls the second inverter based on a signal obtained by adding the second error signal e2 to the first error signal e1, wherein the DC voltages output from the rectifying circuits are combined with each other, and the voltage across the first input capacitor balances with the voltage across the second input capacitor by changing a control signal supplied to an inverter circuit in which the voltage across an input capacitor provided therein is higher so as to increase the output of an inverter provided in the inverter circuit, and by changing a control signal supplied to another inverter circuit in which the voltage across another input capacitor provided therein is lower so as to decrease the output of another inverter provided in another inverter circuit.

In the first or second aspect of the present invention, the semiconductor switching devices provided in the inverter circuits may have almost the same withstand voltages.

In the first or second aspect of the present invention, pulse width control of the inverter circuits to balance the voltages across the first and second input capacitors may be performed such that the pulse width of a pulse width modulated signal supplied to an inverter circuit in which the voltage across an input capacitor provided therein is higher is widened and the pulse width of a pulse width modulated signal supplied to another inverter circuit in which the voltage across another input capacitor provided therein is lower is narrowed.

In the first or second aspect of the present invention, frequency modulation control of the inverter circuits to balance the voltages across the first and second input capacitors may be performed such that the frequency of a frequency modulated signal supplied to an inverter circuit in which the voltage across an input capacitor provided therein is higher is increased and the frequency of a frequency modulated signal supplied to another inverter circuit in which the voltage across another input capacitor provided therein is lower is decreased.

In the second aspect of the present invention, the first control circuit may comprise: a subtracter which subtracts the second error signal e2 from the first error signal e1 to generate a first corrected error signal eA; a first PWM comparator which compares the first corrected error signal eA with a saw tooth wave signal to generate a first pulse width modulated signal; and a first signal distributor which distributes the first pulse width modulated signal to the first inverter, and the second control circuit may comprise: an adder which adds the second error signal e2 to the first error signal e1 to generate a second corrected error signal eB; a second PWM comparator which compares the second corrected error signal eB with a saw tooth wave signal to generate a second pulse width modulated signal; and a second signal distributor which distributes the second pulse width modulated signal to the second inverter.

In the second aspect of the present invention, the first control circuit may comprise: a subtracter which subtracts the second error signal e2 from the first error signal e1 to generate a first corrected error signal eA; a first voltage controlled oscillator which generates a first frequency signal having a frequency which corresponds to the value of the first corrected error signal eA; and a first signal distributor which distributes the first frequency signal to the first inverter, and the second control circuit may comprise: an adder which adds the second error signal e2 to the first error signal e1 to generate a second corrected error signal eB; a second voltage controlled oscillator which generates a second frequency signal having a frequency which corresponds to the value of the second corrected error signal eB; and a second signal distributor which distributes the second frequency signal to the second inverter.

In addition, a circuit which generates the first corrected error signal eA and the second corrected error signal eB may comprise: a first polarity inversion circuit which inverts the polarity of the first error signal e1 to generate a signal −e1; a second polarity inversion circuit which inverts the polarity of the second error signal e2 to generate a signal −e2; a first inverting/adding circuit which inverts the signals −e1 and −e2 and adds the inverted signals to generate the first error corrected signal eA; and a second inverting/adding circuit which inverts the signal −e1 and the second error signal e2 and adds the inverted signals to generate the second error corrected signal eB.

According to the present invention, it is possible to configure a power conversion device by using semiconductor switching devices such as FETs which are inexpensive and have low forward voltage drops and withstand voltages lower than the maximum value of a DC voltage including the fluctuation thereof obtained by rectifying a commercial AC power supply high voltage of a 400V system and so forth, thereby realizing high frequency operation, high efficiency, and reduction in cost.

DETAILED DESCRIPTION OF THE PREFERRED EMBODIMENTS

Hereinbelow, embodiments of the present invention will be described with reference to the attached drawings.

Figure 1:
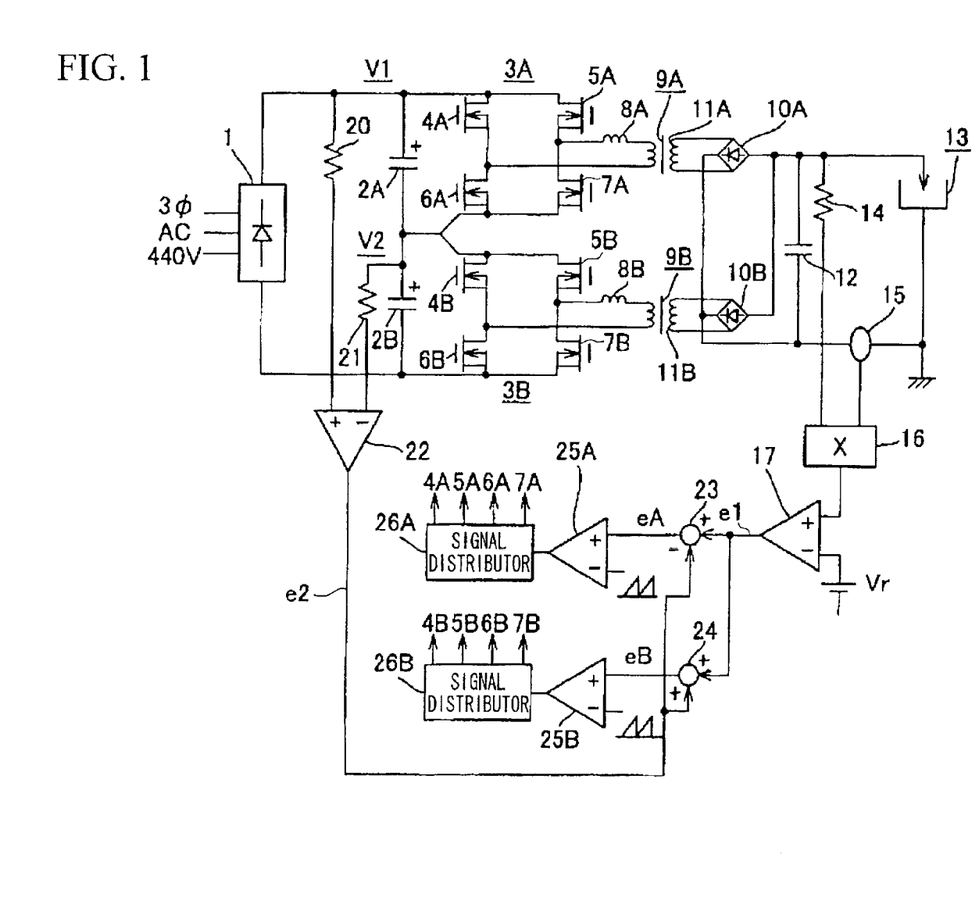
FIG. 1 shows the structure of a power conversion device according to a first embodiment of the present invention.

FIG. 1 shows a circuit of a sputtering power supply device, which is a power conversion device according to a first embodiment of the present invention. Reference symbol 1 denotes a three-phase rectifier which rectifies a commercial AC power supply high voltage being a three-phase AC 400V. The maximum value of the rectified voltage reaches 620V including the fluctuation of the input commercial AC power supply high voltage. Since the withstand voltage of a typical electrolytic capacitor used for smoothing the rectified voltage is about 450V, electrolytic capacitors (input capacitors) 2A and 2B having the withstand voltage of 400V are employed here, and these input capacitors are connected in series. Hereinbelow, the circuit connected to the input capacitor 2A is referred to as an A-system circuit, and the circuit connected to the input capacitor 2B is referred to as a B-system circuit. Since the structure of the A-system circuit is the same as that of the B-system, reference symbols assigned to the respective components provided in the B-system circuit are the same as those assigned to the corresponding components provided in the A-system circuit except for the suffix thereof. That is, the suffix "A" is used for each reference symbol in the A-system circuit, while the suffix "B" is used for each reference symbol in the B-system circuit. In view of the above, only the A-system circuit will be described in detail. Reference symbol 3A denotes a voltage controlled type pulse width modulation (PWM) bridge inverter which is connected to the input capacitor 2A and which converts a given DC power supply voltage into a high frequency AC voltage. The inverter 3A includes four FETs 4A to 7A, which are inexpensive and have withstand voltages of about 500V. If IGBTs are used to constitute the inverter 3A instead of the FETs, it is necessary to prepare anti-parallel diodes in addition to the IGBTs. Reference symbol 8A denotes a current limiting inductance connected to an output terminal of the inverter 3A. Reference symbol 9A denotes a transformer which converts a high frequency voltage output from the inverter 3A into a suitable voltage, while isolating a load apparatus system from a commercial power supply system to insulate therebetween. The above-described components constitute the inverter circuit of the A-system circuit. Reference symbol 10A denotes a bridge rectifying circuit which is connected to a secondary winding 11A of the transformer 9A. The outputs of the bridge rectifying circuit 10A and bridge rectifying circuit 10B respectively correspond to the outputs of the A-system circuit and the B-system circuit, and they are connected to an identical filter capacitor 12 and supply DC power to a load 13 of the sputtering power supply device.

A voltage detection circuit 14 detects the DC voltage output from the sputtering power supply device, and a current detection circuit 15 detects the output current therefrom. A multiplier 16 multiplies the detected DC voltage by the detected output current to generate a power signal corresponding to the detected power. A first error amplifier 17 compares the voltage corresponding to the detected power with a reference voltage Vr corresponding to a predetermined reference power to generate a first error signal e1. According to a conventional control scheme, a comparator directly compares an error signal corresponding to the first error signal e1 with a saw tooth wave signal to generate a PWM signal which serves as a signal for turning on FETs. In contrast, the present embodiment employs the following structure.

Detection resistors 20 and 21 respectively detect a voltage V1 across the input capacitors 2A and 2B and a midpoint voltage V2 with the ratio of 1:2. For example, the resistor 20 outputs 5V when the voltage V1 across the input capacitors 2A and 2B is 600V, while the resistor 21 outputs 5V when the midpoint voltage V2 is 300V. A second error amplifier 22 compares these detected voltages to generate a second error signal e2. The second error signal e2 is set to +5V when the voltage across the input capacitor 2A in the A-system circuit is relatively higher than the voltage across the input capacitor 2B in the B-system circuit. Moreover, the second error signal e2 is set to −5V when the former voltage is relatively lower than the latter voltage. Furthermore, the second error signal e2 is set to the middle of the former voltage and the latter voltage, i.e., approximately zero, when the former voltage balances with the latter voltage.

Since it is necessary for practical sputtering power supply devices to isolate a DC output system (i.e., the load apparatus system) from the commercial power supply system so as to insulate therebetween, a signal insulating/isolating device such as a photo coupler and an insulation amplifier should be provided at either an input signal side or an output signal side of the second error amplifier 22. However, the signal insulating/isolating device is omitted from the drawings because the explanation here focuses on the principle of operations.

The first error signal e1 and the second error signal e2 are both applied to a subtracter 23 and an adder 24. The subtracter 23 subtracts the second error signal e2 from the first error signal e1 to generate a corrected error signal eA for the A-system circuit. The adder 24 adds the first error signal e1 and the second error signal e2 to generate a corrected error signal eB for the B-system circuit. A PWM comparator 25A compares the corrected error signal eA for the A-system circuit with a saw tooth wave signal supplied to an inverting terminal of the PWM comparator 25A to generate a PWM signal. A PWM comparator 25B compares the corrected error signal eB for the B-system circuit with a saw tooth wave signal supplied to an inverting terminal of the PWM comparator 25B to generate a PWM signal. These saw tooth wave signals are generated by an identical saw tooth wave signal generator (not shown), and the frequencies of the saw tooth wave signals are double the conversion frequencies which the inverter circuits employ. The reason is that, as will be explained later, each of signal distributors 26A and 26B distributes the PWM signal to supply two-phase signals to the corresponding inverter, and thus the frequency of each two-phase signal becomes half of the frequency of the saw tooth wave signal. Specifically, the signal distributor 26A alternately distributes the PWM signal output from the PWM comparator 25A to two pairs of FETs provided in the inverter 3A. In the same manner, the signal distributor 26B alternately distributes the PWM signal output from the PWM comparator 25B to two pairs of FETs provided in the inverter 3B.

Next, the operation of the present embodiment will be explained. Each power conversion circuit which is comprised of the input capacitor and the inverter circuit is constructed using a conventional technique and the operation thereof is well known. Therefore, the structure and the operation thereof are not explained here. There are differences in characteristics of components such as FETs being semiconductor switching devices and transformers between the power conversion circuit in the A-system and the power conversion circuit in the B-system. Thus, even if the same PWM signal is applied to the inverters provided in these systems, the power converted by the A-system differs from the power converted by the B-system. In other words, the power extracted from the input capacitor 2A is different from the power extracted from the input capacitor 2B. As a result, the voltage across the input capacitor 2A and the voltage across the input capacitor 2B become imbalanced at any time. If the degree of imbalance increases excessively, the voltages across the input capacitors 2A and 2B exceed the withstand voltages of the FETs 4A to 7A and 4B to 7B, resulting in damage of these FETs.

The present embodiment takes advantage of the corrected error signals eA and eB obtained by correcting the first error signal e1 with the second error signal e2 to control the pulse widths of the PWM signals. Specifically, the pulse width of the PWM signal for a system in which the voltage across the input capacitor therein is relatively higher is widened to extract more current therefrom, thereby decreasing the voltage across the input capacitor. Conversely, the pulse width of the PWM signal for another system in which the voltage across the input capacitor therein is relatively lower is narrowed to extract less current therefrom, thereby increasing the voltage across the input capacitor. The second error signal e2 becomes positive when the voltage across the input capacitor 2A provided in the A-system circuit is higher than the voltage across the input capacitor 2B provided in the B-system circuit. Accordingly, the second error signal e2 is added to the first error signal e1 to obtain the corrected error signal eA (i.e., e1+e2), which is supplied to a PWM circuit comprised of the PWM comparator 25A and the signal distributor 26A of the A-system circuit. Since the PWM comparator 25A generates a high-level pulse when the voltage of the corrected error signal eA is higher than the voltage of the saw tooth wave signal, the corrected error signal eA (i.e., e1+e2) widens the pulse width of the PWM signal. At the same time, the second error signal e2 is subtracted from the first error signal e1 to obtain the corrected error signal eB (i.e., e1−e2), which is supplied to a PWM circuit comprised of the PWM comparator 25B and the signal distributor 26B of the B-system circuit, thereby narrowing the pulse width of the PWM signal therefor.

As a result, in the power conversion circuit of the A-system in which the pulse width of the PWM signal is widened, the power extracted from the input capacitor 2A increases, and thus the voltage across the input capacitor 2A decreases. In contrast, in the power conversion circuit of the B-system in which the pulse width of the PWM signal is narrowed, the power extracted from the input capacitor 2B decreases, and thus the voltage across the input capacitor 2B increases.

Conversely, when the voltage across the input capacitor 2A provided in the power conversion circuit of the A-system is lower than the voltage across the input capacitor 2B provided in the power conversion circuit of the B-system, the second error amplifier 22 generates a negative voltage as the second error signal e2. As a result, a correction operation converse to the correction operation described above will be performed. By repeating the correction operations of the pulse widths described above, the voltage across the input capacitor 2A in the power conversion circuit of the A-system balances with the voltage across the input capacitors 2B in the power conversion circuit of the B-system. As a result, no excess voltages are applied to the FETs which are provided in one of the two inverters. In addition, voltages exceeding the withstand voltages of the FETs provided in the inverters are not applied to these FETs. Accordingly, even when semiconductor switching devices whose withstand voltages are lower than the input DC power supply voltage are used, it is possible to prevent the semiconductor switching devices from damage due to the application of excess voltages.

Figure 2:
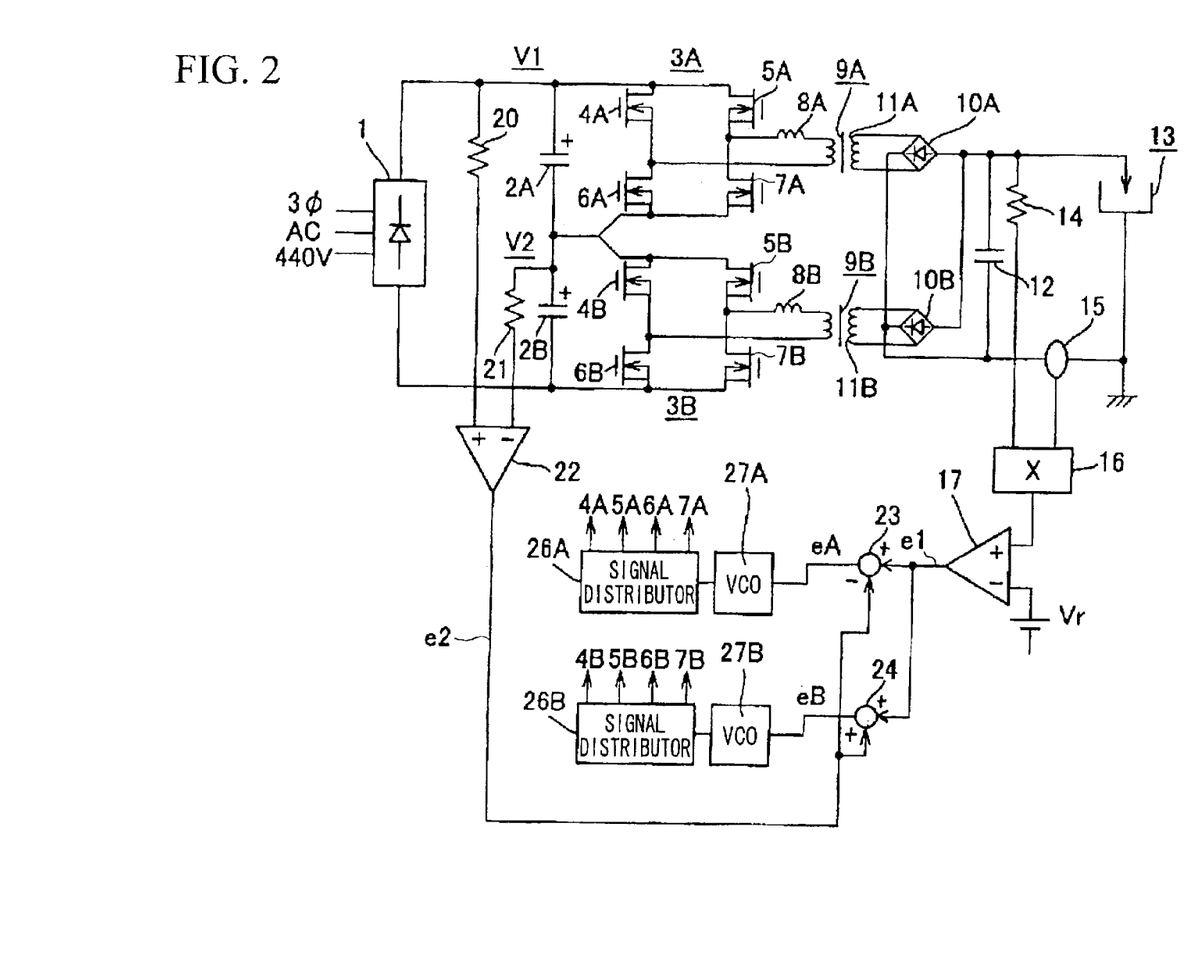
FIG. 2 shows the structure of a power conversion device according to a second embodiment of the present invention.

Next, a second embodiment of the present invention which controls the frequencies of inverters will be explained with reference to FIG. 2. In order to control the frequencies, the present embodiment employs voltage controlled oscillators 27A and 27B instead of the PWM comparators 25A and 25B shown in FIG. 1. A voltage controlled oscillator (VCO) generates an output signal whose frequency varies in accordance with the voltage of a given input signal.

Therefore, the voltage controlled oscillators 27A and 27B respectively generate control signals whose frequencies vary in accordance with the magnitude of the corrected error signals eA and eB. In the same manner as the first embodiment, the frequencies of control signals supplied to the power conversion circuit in a system in which the voltage across the input capacitor provided therein is relatively higher is increased to extract more current therefrom, thereby decreasing the voltage across the input capacitor. Conversely, the frequencies of control signals supplied to the power conversion circuit in another system in which the voltage across the input capacitor provided therein is relatively lower is decreased to extract less current therefrom, thereby increasing the voltage across the input capacitor. Thus, the voltages across the input capacitors balance with each other. In this way, the voltage across the input capacitor 2A provided in the power conversion circuit of the A-system balances with the voltage across the input capacitor 2B provided in the power conversion circuit of the B-system, by repeating the correction operations of the frequencies of the control signals described above. As a result, no excess voltages are applied to the FETs which are provided in one of the two inverters. In addition, voltages exceeding the withstand voltages of the FETs provided in the inverters are not applied to the FETs. Accordingly, even when semiconductor switching devices whose withstand voltages are lower than the input DC power supply voltage are used, it is possible to prevent the semiconductor switching devices from being damaged due to the application of excess voltages.

Figure 3:
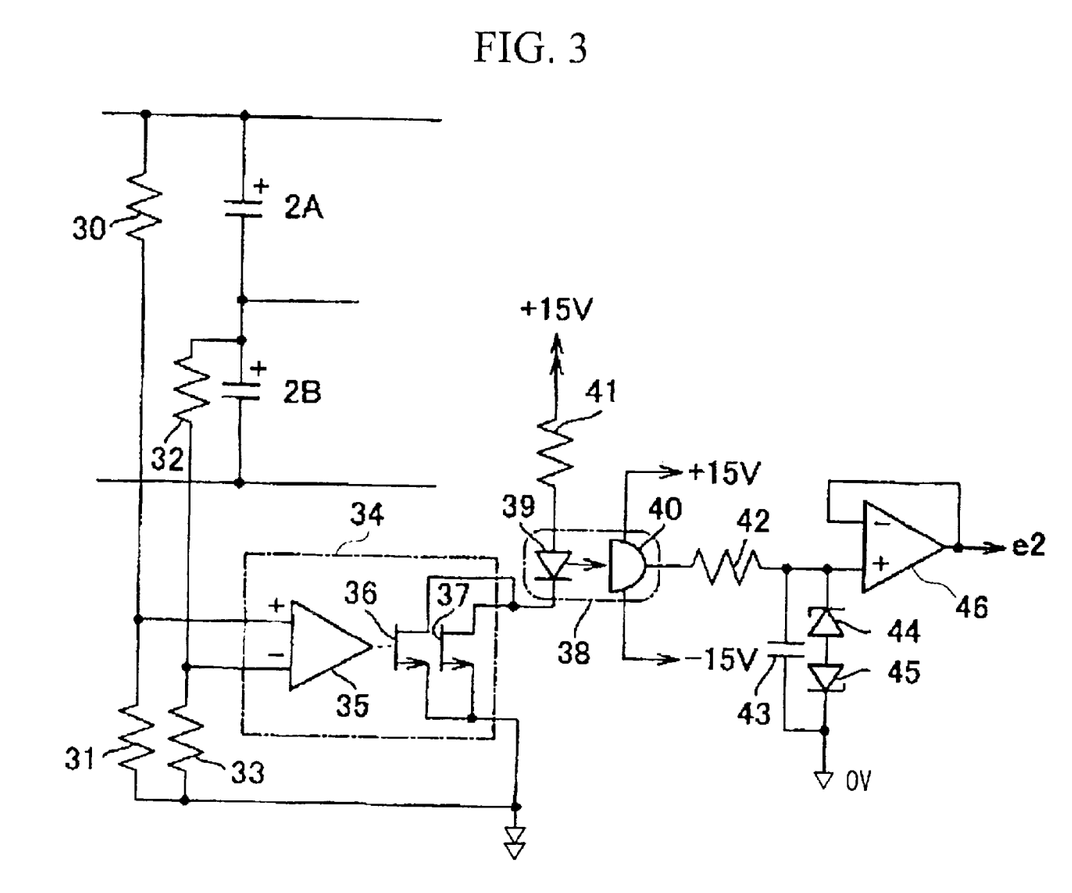
FIG. 3 shows the structure of a first example of a circuit for detecting the difference between the voltages across input capacitors as an error signal which is used in the power conversion devices according to the respective embodiments of the present invention.

FIG. 3 shows a specific example of a circuit for generating the second error signal provided in the power conversion circuits according to the above-described embodiments. Detection resistors 30 to 33 detect the voltages across the input capacitors 2A and 2B. The detected voltages are respectively applied to an inverting input terminal and a non-inverting input terminal of an error amplifier 35 provided in a switching regulator IC 34 (for example, MB3759 made by Fujitsu Limited). MB3759 integrates a PWM circuit comprised of a saw tooth wave signal generation circuit, a comparator, and so forth, and converts the detected voltages into a PWM signal, which is used for driving a photo coupler 38 through open collector terminals of two output transistors 36 and 37 connected in parallel. Since the output transistors 36 and 37 are connected in parallel, it is possible to vary a pulse-on duty cycle from 0% to almost 100%. The photo coupler 38 is provided with a photo diode 39 and a receiver side amplifier 40 which amplifies an optical signal received from the photo diode 39 and converts the amplified optical signal into an electrical signal. Reference symbol 41 denotes a series resistor which limits a current for driving the photo diode 39. When the voltages of −15V and +15V are applied to the receiver side amplifier 40 as controlled power supply voltages, the receiver side amplifier 40 outputs a PWM signal which is variable within the range of −15V to +15V. The photo coupler 38 corresponds to the aforementioned device for isolating signals of the DC output system from signals of the commercial power supply system to insulate therebetween. A filter circuit comprised of a resistor 42 and a capacitor 43 converts the PWM signal into a DC voltage signal. Two zener diodes 44 and 45 whose anode electrodes are connected with each other limit the level of the DC voltage signal so that the limited level falls within the range of −5V to +5V. The signal level becomes −5V when the pulse-on duty of the PWM signal is 0%, while it becomes +5V when the pulse-on duty of the PWM signal is 100%. A buffer amplifier 46 receives the DC voltage signal whose level is limited, and outputs the second error signal e2.

Figure 4:
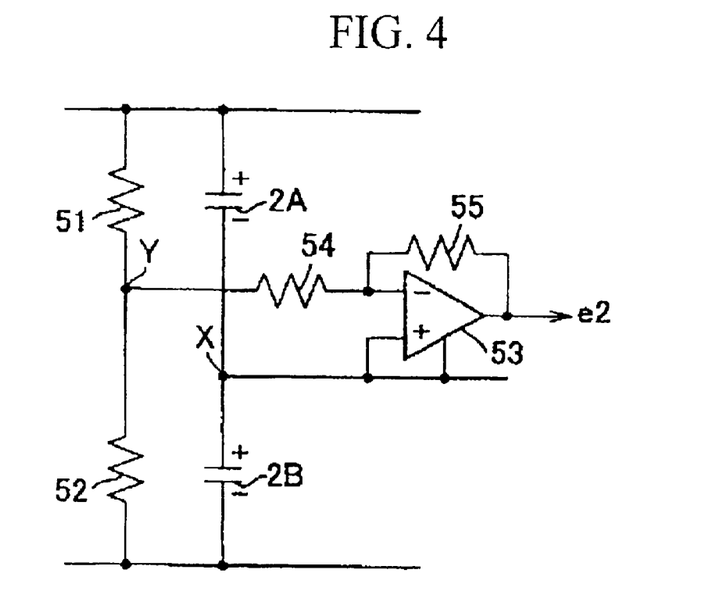
FIG. 4 shows the structure of a second example of a circuit for detecting the difference between the voltages across input capacitors as an error signal which is used in the power conversion devices according to the respective embodiments of the present invention.

FIG. 4 shows a second example of the detection circuit which detects imbalance between the voltages across the input capacitors 2A and 2B respectively provided in the power conversion circuits of the A-system and the B-system. As shown in FIG. 4, the detection circuit is provided with an error amplifier 53, an input resistor 54, and a feedback resistor 55, and a reference potential therefor is supplied from a midpoint X between the input capacitors 2A and 2B. Two resistors 51 and 52 having an identical resistance value are connected in series across the DC power supply voltage, and the voltage at a midpoint Y therebetween is applied to the error amplifier 53. The error amplifier 53 generates the second error signal e2 so that the voltage at the midpoint Y between the resistor 51 and 52 is equal to the reference potential (i.e., the potential at the midpoint X). The second error signal e2 are insulated from the detection circuit, and then supplied to the control circuit of the inverters which is comprised of the subtracter 23, the adder 24, and the PWM circuits.

Figure 5:
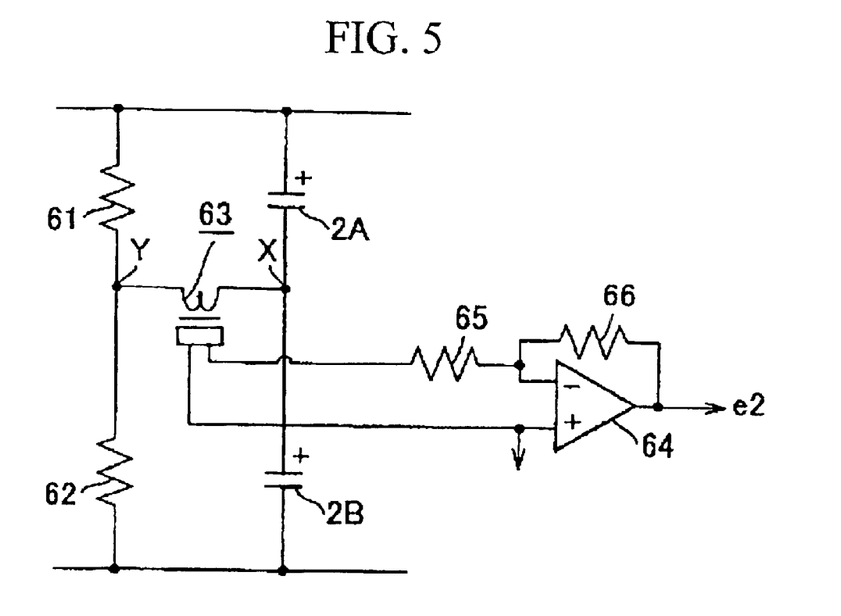
FIG. 5 shows the structure of a third example of a circuit for detecting the difference between the voltages across input capacitors as an error signal which is used in the power conversion devices according to the respective embodiments of the present invention.

FIG. 5 shows a third example of the detection circuit which detects imbalance between the voltages across the input capacitors 2A and 2B respectively provided in the power conversion circuits of the A-system and the B-system. Two resistors 61 and 62 having an identical resistance value are connected in series across the DC power supply voltage. A Hall CT 63 which serves as a current detector that employs a Hall element is connected between a midpoint Y of the resistors 61 and 62 and a midpoint X of the input capacitors 2A and 2B. If there is a difference between the voltage at the midpoint X and the voltage at the midpoint Y, a current flows through the Hall CT 63 from a higher potential side to a lower potential side. As a result, it is possible to decide which voltage is higher of the voltages at the midpoint X and at the midpoint Y, based on the polarity of the current detected by the Hall CT 63. In conjunction with an input resistor 65 and a feedback resistor 66, an error amplifier 64 generates the second error signal e2 so that the detected current becomes zero, i.e., the voltage at the midpoint X balances with the voltage at the midpoint Y. In this example, the Hall CT 63 electrically insulates the DC output system from the commercial power supply system.

Figure 6:
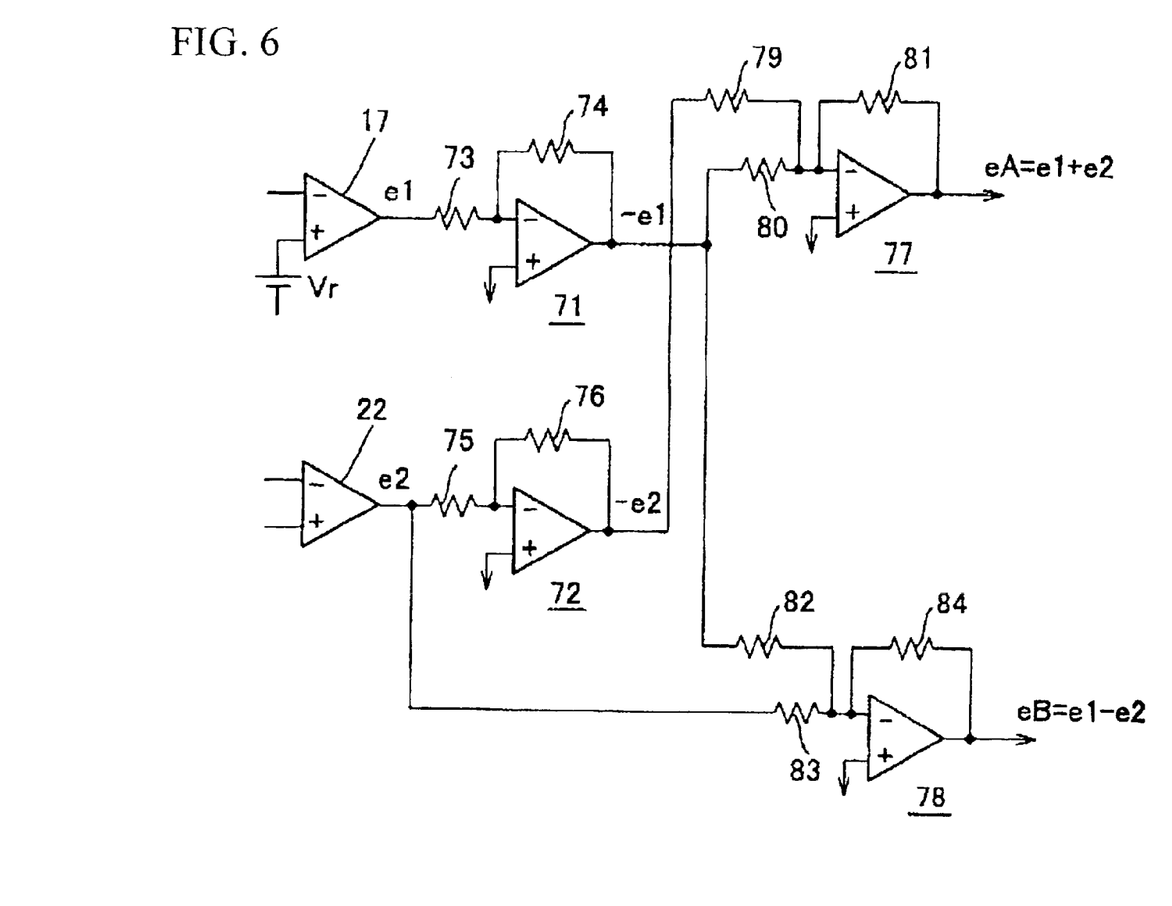
FIG. 6 shows the structure of an example of a circuit for generating a corrected error signal used in the power conversion devices according to respective embodiments of the present invention.

FIG. 6 shows a specific example which forms the adder 24 and the subtracter 23 shown in FIG. 1 with operational amplifiers ($\mu$PC 451 made by NEC Corporation). Reference symbol 17 corresponds to the first error amplifier shown in FIG. 1 and outputs the first error signal e1. When the first error signal e1 is at a high level, the level of a DC voltage output from the power conversion device increases. Reference symbol 22 corresponds to the second error amplifier shown in FIG. 1, and outputs the second error signal e2. The second error signal e2 becomes high when the voltage across the input capacitor 2A is higher than the voltage across the input capacitor 2B. Reference symbols 71 and 72 are well known inverting amplifiers which are respectively comprised of a combination of resistors 73 and 74 having an identical resistance value and a combination of resistors 75 and 76 having an identical resistance value, and respectively output an error signal −e1 and an error signal −e2 which are obtained by inverting the first error signal e1 and the second error signal e2, respectively. Reference symbols 77 and 78 are well known inverting adder circuits which are respectively combined with resistors 79 to 80 having an identical resistance value and resistors 82 and 83 having an identical resistance value. The inverting adder circuit 77 receives the error signals −e1 and −e2, inverts these error signals, adds these inverted error signals, and outputs the corrected error signal eA (i.e., e1+e2). The inverting adder circuit 78 receives the error signals −e1 and e2, inverts these error signals, adds these inverted error signals, and outputs the corrected error signal eB (i.e., e1−e2). PWM comparators which respectively correspond to the PWM comparators 25A and 25B shown in FIG. 1 receive the corrected error signals eA and eB, respectively, and supply PWM signals to corresponding signal distributors in the same manner as in FIG. 1.

As described above, in the embodiments of the present invention, two input capacitors are connected in series across the input DC power supply voltage, two inverters comprised of FETs having low withstand voltages are respectively connected between both ends of the input capacitors, control signals supplied to the inverters are controlled so that voltages supplied to the respective inverters are approximately equal to half of the input DC power supply voltage. As a result, the voltages across the input capacitors balance with each other, and semiconductor switching devices such as FETs whose withstand voltages are lower than the input DC power supply voltage can be used. However, the present invention is not limited to such structure, and it is also possible to configure the power conversion device such that n input capacitors are connected in series across the input DC power supply voltage, n inverters comprised of FETs having low withstand voltages are respectively connected between both ends of the input capacitors, and control signals supplied to the respective invertors are controlled so that input voltages supplied to the respective inverters are approximately equal to 1/n of the input DC power supply voltage, thereby balancing the voltages across the n input capacitors which are connected in series.

In addition, each of the embodiments described above detects the voltage of a load and the current flowing through the load, multiplies the detected voltage by the detected current to obtain an output power, and obtains the first error signal e1 based on a voltage signal corresponding to the output power and a reference voltage. However, it is also possible to configure the power conversion device such that the first error signal e1 is obtained based on the reference voltage and a voltage signal corresponding to either the detected voltage of the load or the detected current flowing through the load, and a constant voltage control or a constant current control is performed. Moreover, although DC outputs of the two inverters are connected in parallel in the above-described embodiments, it is also possible to configure the power conversion device such that these inverters are arranged in series to combine the DC outputs thereof.

What is claimed is:

1. A power conversion device, comprising:
   n, n being an integer greater than one, input capacitors which are connected in series between output terminals of a DC input power supply;
   n inverter circuits which include n inverters whose input terminals are respectively connected to both ends of the input capacitors, and n transformers which have primary windings respectively connected to the n inverters and secondary windings electro-magnetically coupled with the primary windings; and
   n rectifying circuits which convert AC voltages across the secondary windings into DC voltages;
   a first error amplifier which generates a first error signal e1 based on a predetermined reference value and a signal corresponding to the detected value of either one of an output power, a DC output voltage, or a DC output current obtained by combining outputs of the n rectifying circuits:

a second error amplifier which generates second error signals e2 by comparing the voltages across the n input capacitors: and a control circuit which controls the n inverters based on signals obtained by subtracting the respective second error signals e2 from the first error signal e1 and on signals obtained by adding the first error signal e1 to the respective second error signals e2, wherein the DC voltages output from the rectifying circuits are combined with each other, semiconductor switching devices used in the inverter circuits have withstand voltages lower than the maximum value of an output voltage of the DC input power supply, and the inverter circuits are controlled such that input voltages applied to the respective inverter circuits are approximately equal to a voltage obtained by dividing the output voltage of the DC input power supply by n so as to balance the voltages across the input capacitors with each other and to voltages lower than the withstand voltages of the semiconductor switching devices are applied to the semiconductor switching devices.

2. A power conversion device, comprising:

first and second input capacitors which are connected in series between output terminals of a DC input power supply;

first and second inverter circuits which include first and second inverters whose input terminals are respectively connected to both ends of the first and second input capacitors, and first and second transformers which have primary windings connected to the first and second inverters and secondary windings electromagnetically coupled with the primary windings;

first and second rectifying circuits which convert AC voltages across the secondary windings into DC voltages;

a first error amplifier which generates a first error signal e1 based on a predetermined reference value and a signal corresponding to the detected value of either one of an output power, a DC output voltage, or a DC output current obtained by combining outputs of the first and second rectifying circuits;

a second error amplifier which generates a second error signal e2 by comparing the voltage across the first input capacitor with the voltage across the second input capacitor;

a first control circuit which controls the first inverter based on a signal obtained by subtracting the second error signal e2 from the first error signal e1; and a second control circuit which controls the second inverter based on a signal obtained by adding the second error signal e2 to the first error signal e1, wherein the DC voltages output from the rectifying circuits are combined with each other, and the voltage across the first input capacitor balances with the voltage across the second input capacitor by changing a control signal supplied to an inverter circuit in which the voltage across an input capacitor provided therein is higher so as to increase the output of an inverter provided in the inverter circuit, and by changing a control signal supplied to another inverter circuit in which the voltage across another input capacitor provided therein is lower so as to decrease the output of another inverter provided in another inverter circuit.

3. A power conversion device according to claim 1, wherein the semiconductor switching devices provided in the inverter circuits have almost the same withstand voltages.

4. A power conversion device according to claim 2, wherein the semiconductor switching devices provided in the inverter circuits have almost the same withstand voltages.

5. A power conversion device according to claim 1, wherein pulse width control of the inverter circuits to balance the voltages across the first and second input capacitors is performed such that the pulse width of a pulse width modulated signal supplied to an inverter circuit in which the voltage across an input capacitor provided therein is higher is widened and the pulse width of a pulse width modulated signal supplied to another inverter circuit in which the voltage across another input capacitor provided therein is lower is narrowed.

6. A power conversion device according to claim 2, wherein pulse width control of the inverter circuits to balance the voltages across the first and second input capacitors is performed such that the pulse width of a pulse width modulated signal supplied to an inverter circuit in which the voltage across an input capacitor provided therein is higher is widened and the pulse width of a pulse width modulated signal supplied to another inverter circuit in which the voltage across another input capacitor provided therein is lower is narrowed.

7. A power conversion device according to claim 1, wherein frequency modulation control of the inverter circuits to balance the voltages across the first and second input capacitors is performed such that the frequency of a frequency modulated signal supplied to an inverter circuit in which the voltage across an input capacitor provided therein is higher is increased and the frequency of a frequency modulated signal supplied to another inverter circuit in which the voltage across another input capacitor provided therein is lower is decreased.

8. A power conversion device according to claim 2, wherein frequency modulation control of the inverter circuits to balance the voltages across the first and second input capacitors is performed such that the frequency of a frequency modulated signal supplied to an inverter circuit in which the voltage across an input capacitor provided therein is higher is increased and the frequency of a frequency modulated signal supplied to another inverter circuit in which the voltage across another input capacitor provided therein is lower is decreased.

9. A power conversion device according to claim 2, wherein the first control circuit comprises:

a subtracter which subtracts the second error signal e2 from the first error signal e1 to generate a first corrected error signal eA;

a first PWM comparator which compares the first corrected error signal eA with a saw tooth wave signal to generate a first pulse width modulated signal; and a first signal distributor which distributes the first pulse width modulated signal to the first inverter, and wherein the second control circuit comprises:

an adder which adds the second error signal e2 to the first error signal e1 to generate a second corrected error signal eB;

a second PWM comparator which compares the second corrected error signal eB with a saw tooth wave signal to generate a second pulse width modulated signal; and a second signal distributor which distributes the second pulse width modulated signal to the second inverter.

10. A power conversion device according to claim 2, wherein the first control circuit comprises:

a subtracter which subtracts the second error signal e2 from the first error signal e1 to generate a first corrected error signal eA;

a first voltage controlled oscillator which generates a first frequency signal having a frequency which corresponds to the value of the first corrected error signal eA; and a first signal distributor which distributes the first frequency signal to the first inverter, and wherein the second control circuit comprises:

an adder which adds the second error signal e2 to the first error signal e1 to generate a second corrected error signal eB;

a second voltage controlled oscillator which generates a second frequency signal having a frequency which corresponds to the value of the second corrected error signal eB; and a second signal distributor which distributes the second frequency signal to the second inverter.

11. A power conversion device according to claim 9, wherein a circuit which generates the first corrected error signal eA and the second corrected error signal eB comprises:

a first polarity inversion circuit which inverts the polarity of the first error signal e1 to generate a signal −e1;

a second polarity inversion circuit which inverts the polarity of the second error signal e2 to generate a signal −e2;

a first inverting/adding circuit which inverts the signals −e1 and −e2 and adds the inverted signals to generate the first error corrected signal eA; and a second inverting/adding circuit which inverts the signal −e1 and the second error signal e2 and adds the inverted signals to generate the second error corrected signal eB.

12. A power conversion device according to claim 10, wherein a circuit which generates the first corrected error signal eA and the second corrected error signal eB comprises:

a first polarity inversion circuit which inverts the polarity of the first error signal e1 to generate a signal −e1;

a second polarity inversion circuit which inverts the polarity of the second error signal e2 to generate a signal −e2;

a first inverting/adding circuit which inverts the signals −e1 and −e2 and adds the inverted signals to generate the first error corrected signal eA; and a second inverting/adding circuit which inverts the signal −e1 and the second error signal e2 and adds the inverted signals to generate the second error corrected signal eB.

* * * * *